United States Patent
Takada et al.

(10) Patent No.: US 8,339,390 B2
(45) Date of Patent: Dec. 25, 2012

(54) POWER SUPPLY CIRCUIT OF DISPLAY DEVICE AND DISPLAY DEVICE USING THE SAME

(75) Inventors: Naoki Takada, Yokohama (JP); Naruhiko Kasai, Yokohama (JP); Takuya Eriguchi, Yokosuka (JP); Yuki Okada, Tama (JP); Mitsuru Goto, Chiba (JP); Yoshihiro Kotani, Chiba (JP)

(73) Assignees: Hitachi Displays, Ltd., Chiba (JP); Panasonic Liquid Crystal Display Co., Ltd., Hyogo-ken (JP)

(*) Notice: Subject to any disclaimer, the term of this patent is extended or adjusted under 35 U.S.C. 154(b) by 524 days.

(21) Appl. No.: 12/625,683

(22) Filed: Nov. 25, 2009

(65) Prior Publication Data
US 2010/0128022 A1    May 27, 2010

(30) Foreign Application Priority Data

Nov. 25, 2008  (JP) .................................. 2008-299466
Oct. 8, 2009   (JP) .................................. 2009-234647

(51) Int. Cl.
*G06F 3/038* (2006.01)
(52) U.S. Cl. ......................................... 345/213; 345/94
(58) Field of Classification Search .................. None
See application file for complete search history.

(56) References Cited

U.S. PATENT DOCUMENTS

| | | |
|---|---|---|
| 6,100,675 A | 8/2000 | Sudo |
| 6,232,964 B1 | 5/2001 | Lee |
| 2002/0126114 A1 | 9/2002 | Yatabe |
| 2005/0083084 A1 | 4/2005 | Aota et al. |
| 2006/0158915 A1 | 7/2006 | Sudo |
| 2007/0040537 A1 | 2/2007 | Low et al. |

FOREIGN PATENT DOCUMENTS

| | | |
|---|---|---|
| EP | 0 974 952 | 1/2000 |
| JP | 2000-278938 | 10/2000 |

*Primary Examiner* — Jason Olson
(74) *Attorney, Agent, or Firm* — Antonelli, Terry, Stout & Kraus, LLP.

(57) ABSTRACT

Provided are a power supply circuit and a display device which are capable of enhancing power efficiency even when applied to a display panel whose current consumption varies. The power supply circuit boosts and outputs an input voltage using a booster chopper circuit. A frequency control circuit changes a frequency of a clock signal, which controls a switch of the chopper circuit, in accordance with a load of the power supply circuit. The frequency control circuit divides an operation of the display device into a display effective period at a high load and a vertical retrace period at a low load, based on a vertical synchronizing signal and a horizontal synchronizing signal. The frequency control circuit sets the frequency of the clock signal in a high-load period to be higher than that in a low-load period.

19 Claims, 11 Drawing Sheets

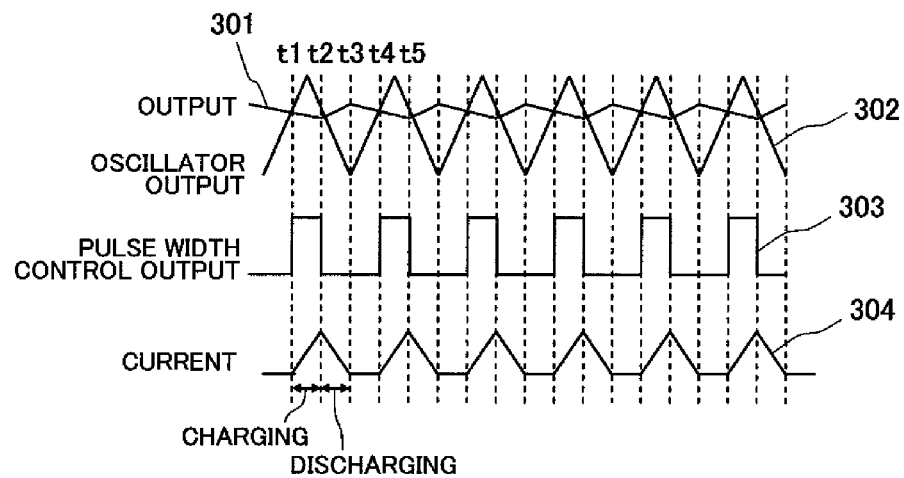
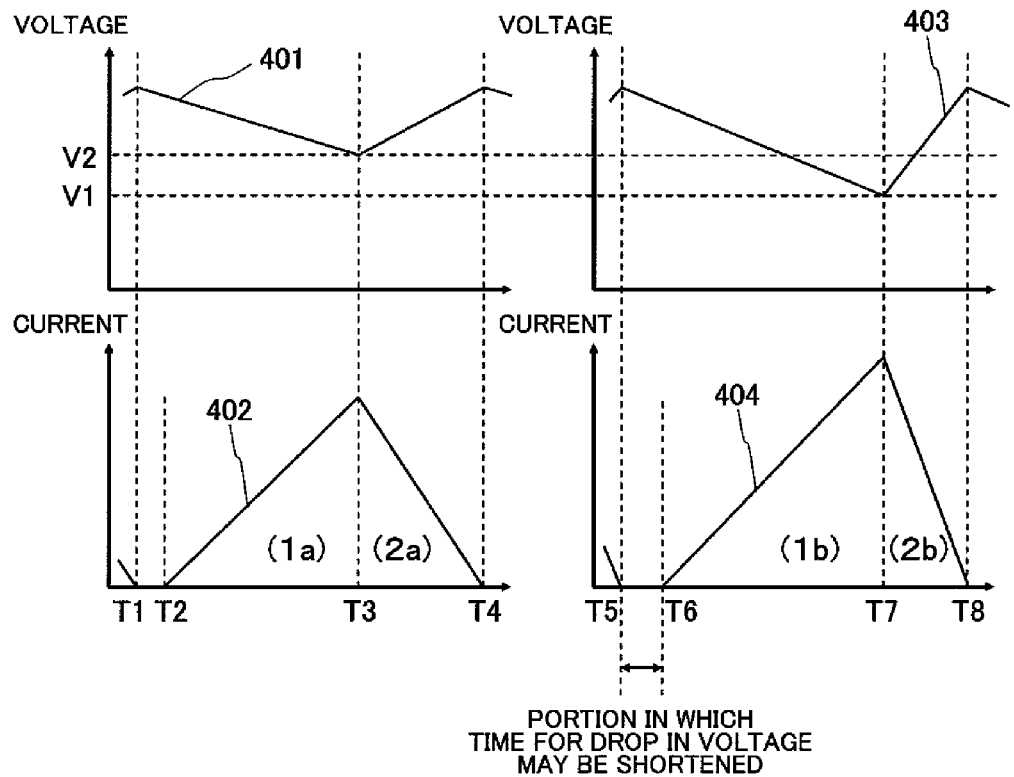

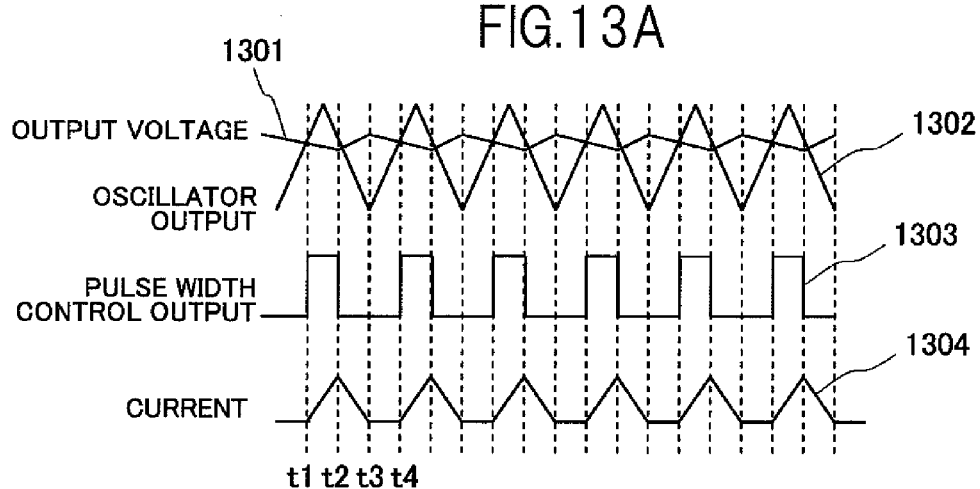
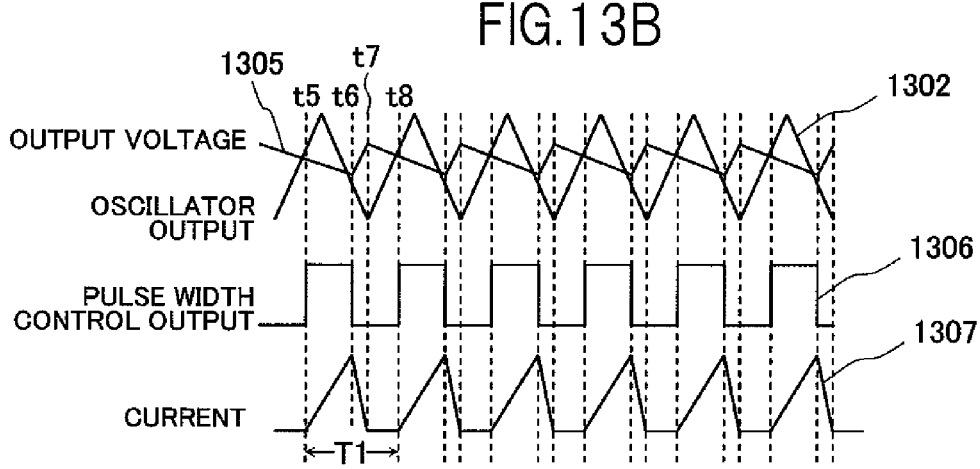
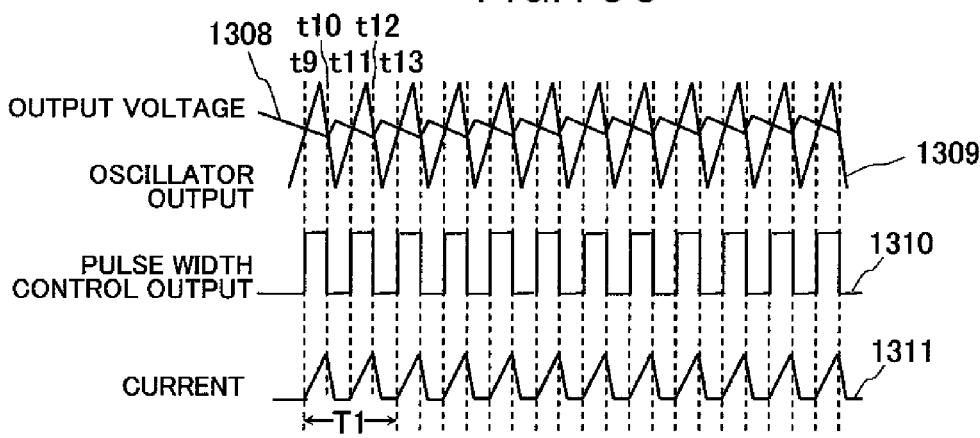

POWER SUPPLY CIRCUIT OF DISPLAY DEVICE AND DISPLAY DEVICE USING THE SAME

CROSS-REFERENCE TO RELATED APPLICATION

The present application claims priority from Japanese applications JP 2008-299466 filed on Nov. 25, 2008 and JP 2009-234647 filed on Oct. 8, 2009, the contents of which are hereby incorporated by reference into this application.

BACKGROUND OF THE INVENTION

1. Field of the Invention

The present invention relates to a power supply circuit of a display device and a display device using the power supply circuit. In particular, the present invention relates to a power supply circuit and a display device that enhance power efficiency during a write operation of display data.

2. Description of the Related Art

In order to boost a voltage in a power supply portion in a driving circuit for a display device for driving a liquid crystal panel, a switching regulator capable of eliminating a power loss and obtaining power with high precision and high efficiency is used. A power supply circuit using a switching regulator charges a coil with charges corresponding to an input voltage and discharges the charged charges from the coil, thereby boosting a voltage. At this time, the charging and discharging periods for charging and discharging of the charges of the coil are regulated in accordance with a ratio of an ON/OFF time of a switching element using a MOS-FET or the like (duty ratio), and an output voltage is determined based on the duty ratio.

As the power supply circuit using a switching element, there is a power supply circuit disclosed in JP 2000-278938 A. The power supply circuit sets a target voltage to be supplied to a load, compares an output voltage with the target voltage, and prolongs a time for accumulating power in a coil that is accumulation means at a high load, thereby generating a desired output voltage.

SUMMARY OF THE INVENTION

For driving a liquid crystal panel, a high-load period in which a current consumption is large (for example, a data voltage application period) and a low-load period in which a current consumption is small (for example, a data voltage retention period) are present. Therefore, in the power supply circuit disclosed in JP 2000-278938 A, in the case where a duty ratio in a high-load period is set to be the same as that for a low-load period, an output voltage drops greatly, which causes problems that the charging period of a coil becomes long (electromotive force of the coil increases), and power efficiency is degraded. On the other hand, when the ON/OFF frequency is increased so as to suppress the drop in voltage in the high-load period, in the low-load period, the charging of the coil with the charges becomes excessive, which increases an output voltage. Consequently, there arises a problem that power efficiency is degraded.

An object of the present invention is to provide a power supply circuit and a display device which are capable of enhancing power efficiency even in the case where the present invention is applied to a liquid crystal panel whose current consumption varies.

Other objects of the present invention become apparent from the description of the entire specification.

(1) A power supply circuit of a display device according to the present invention is a power supply circuit for boosting an input voltage and supplying a driving voltage higher than the input voltage to the display device, and includes: a coil that is charged with charges corresponding to the input voltage; a switching element for controlling charging of the coil with the charges and discharging of the charged charges; a capacitor for stabilizing an output voltage in a charging period of the coil; an oscillator for generating a clock signal as a reference of the output voltage; a comparator for comparing the clock signal with the output voltage; a pulse control circuit for generating a control signal of the switching element in accordance with an output signal of the comparator; and a frequency control circuit for inputting a vertical synchronizing signal and a horizontal synchronizing signal of the display device, and controlling a frequency of the clock signal generated by the oscillator based on the input vertical synchronizing signal and the input horizontal synchronizing signal. The frequency control circuit counts a number of outputs of the horizontal synchronizing signal following an output of the vertical synchronizing signal. The frequency control circuit switches the frequency of the clock signal between a first state in which the number of outputs of the horizontal synchronizing signal is between a first number of outputs and a second number of outputs which are previously set, and a second state in which the number of outputs of the horizontal synchronizing signal is not between the first number of outputs and the second number of outputs, and controls the frequency of the clock signal for the first state to be higher than the frequency of the clock signal for the second state.

(2) A power supply circuit of a display device according to the present invention is a power supply circuit for boosting an input voltage and supplying a driving voltage higher than the input voltage to the display device, and includes: a coil that is charged with charges corresponding to the input voltage; a switching element for controlling charging of the coil with the charges and discharging of the charged charges; a capacitor for stabilizing an output voltage in a charging period of the coil; an oscillator for generating a clock signal as a reference of the output voltage; a comparator for comparing the clock signal with the output voltage; a pulse control circuit for generating a control signal of the switching element in accordance with an output signal of the comparator; and a frequency control circuit for inputting a dot signal synchronized with writing signals of the display data to the pixel and a horizontal synchronizing signal, and controlling a frequency of the clock signal generated by the oscillator based on the input dot signal and the input horizontal synchronizing signal. The frequency control circuit divides a writing period of the display data to each pixel of red (R), green (G), and blue (B) in one horizontal period into a signal rising period and another period, switches the frequency of the clock signal between the signal rising period and the another period, and controls the frequency of the clock signal for the signal rising period to be higher than the frequency of the clock signal for the another period.

(3) A power supply circuit of a display device according to the present invention is a power supply circuit for boosting an input voltage and supplying a driving voltage higher than the input voltage to the display device, and includes: a coil that is charged with charges corresponding to the input voltage; a switching element for controlling charging of the coil with the charges and discharging of the charged charges; a capacitor for stabilizing an output voltage in a charging period of the coil; an oscillator for generating a clock signal as a reference of the output voltage; a comparator for comparing the clock signal with the output voltage; and a pulse control circuit for generating a control signal of the switching element in accordance with an output signal of the comparator. The pulse control circuit monitors a load of the display device based on a vertical synchronizing signal and a horizontal synchronizing signal of the display device, outputs, in a low-load period in which the load is light, a pulse signal which is the control signal once in a predetermined period, and outputs, in a high-load period in which the load is heavy, the pulse signal at least twice in the predetermined period.

(4) A display device according to the present invention includes a display driving circuit including the power supply circuit according to any one of Items (1) to (3) described above and a display panel for performing an image display in accordance with display data from the display driving circuit.

(5) A power supply circuit of a display device according to the present invention is a power supply circuit for boosting an input voltage and supplying a driving voltage higher than the input voltage to the display device, and includes: a first capacitor that is charged with charges corresponding to the input voltage; a switching element for controlling charging of the first capacitor with the charges and discharging of the charged charges; a second capacitor for stabilizing an output voltage in a charging period of the first capacitor; an oscillator for generating a clock signal as a reference of the output voltage; a comparator for comparing the clock signal with the output voltage; a pulse control circuit for generating a control signal of the switching element in accordance with an output signal of the comparator; and a frequency control circuit for inputting a vertical synchronizing signal and a horizontal synchronizing signal of the display device, and controlling a frequency of the control signal of the switching element output from the pulse control circuit based on the input vertical synchronizing signal and the input horizontal synchronizing signal. The frequency control circuit counts a number of outputs of the horizontal synchronizing signal following an output of the vertical synchronizing signal. The frequency control circuit switches the frequency of the clock signal between a first state in which the number of outputs of the horizontal synchronizing signal is between a first number of outputs and a second number of outputs which are previously set, and a second state in which the number of outputs of the horizontal synchronizing signal is not between the first number of outputs and the second number of outputs, and controls the frequency of the clock signal for the first state to be higher than the frequency of the clock signal for the second state.

(6) A power supply circuit of a display device according to the present invention is a power supply circuit for boosting an input voltage and supplying a driving voltage higher than the input voltage to the display device, and includes: a first capacitor that is charged with charges corresponding to the input voltage; a switching element for controlling charging of the first capacitor with the charges and discharging of the charged charges; a second capacitor for stabilizing an output voltage in a charging period of the first capacitor; an oscillator for generating a clock signal as a reference of the output voltage; a comparator for comparing the clock signal with the output voltage; a pulse control circuit for generating a control signal of the switching element in accordance with an output signal of the comparator; and a frequency control circuit for inputting a vertical synchronizing signal and a horizontal synchronizing signal of the display device, and controlling a frequency of the control signal of the switching element output from the pulse control circuit based on the input vertical synchronizing signal and the input horizontal synchronizing signal. The frequency control circuit divides a writing period of display data to each pixel of red (R), green (G), and blue (B) in one horizontal period into a signal rising period and another period, switches the frequency of the clock signal between the signal rising period and the another period, and controls the frequency of the control signal for the signal rising period to be higher than the frequency of the control signal for the another period.

BRIEF DESCRIPTION OF THE DRAWINGS

In the accompanying drawings:

FIG. 3 is a diagram illustrating a relationship between a control signal of a MOS switch, and an output voltage and an input current in the power supply circuit in the first embodiment of the present invention;

FIG. 4A is a diagram illustrating a relationship between the output voltage and the input current at a low load in a conventional power supply circuit;

FIG. 4B is a diagram illustrating a relationship between the output voltage and the input current at a high load in a conventional power supply circuit;

FIG. 13A is a diagram illustrating a relationship between a control signal of a MOS switch, and an output voltage and an input current at a low load in the power supply circuit in the fifth embodiment of the present invention and the conventional power supply circuit;

FIG. 13B is a diagram illustrating a relationship between the control signal of the MOS switch, and the output voltage and the input current at a high load in the conventional power supply circuit;

FIG. 13C is a diagram illustrating a relationship between the control signal of the MOS switch, and the output voltage and the input current at a high load in the power supply circuit in the fifth embodiment of the present invention;

DETAILED DESCRIPTION OF THE INVENTION

Figure 1:
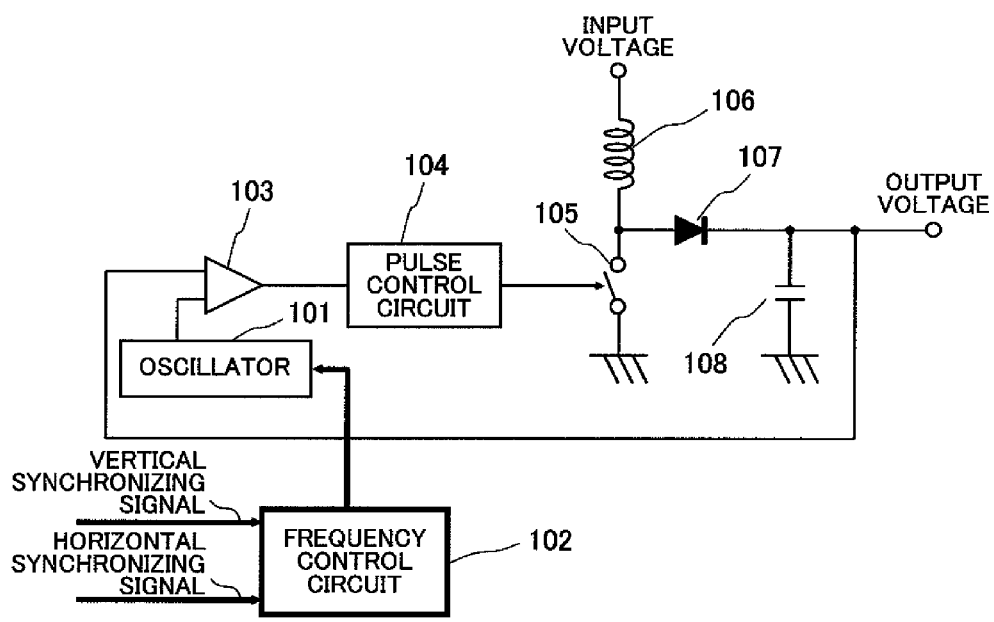
FIG. 1 is a diagram illustrating a schematic configuration of a power supply circuit of a display device in a first embodiment of the present invention.

Hereinafter, embodiments to which the present invention is applied are described with reference to the drawings. It should be noted that the same components are denoted with the same reference numerals and the repeated descriptions thereof are omitted in the following description.

First Embodiment

FIG. 1 is a diagram illustrating a schematic configuration of a power supply circuit of a display device in the first embodiment of the present invention. As illustrated in FIG. 1, the power supply circuit in the first embodiment includes a frequency control circuit 102 for inputting a vertical synchronizing signal and a horizontal synchronizing signal and controlling the oscillation frequency of an oscillator 101 based on the vertical synchronizing signal and the horizontal synchronizing signal. A clock signal from the oscillator 101 and an output voltage are input to a comparator 103, and a pulse control circuit 104 controls the ON/OFF of a MOS switch (switching element) made of a MOS-TFT, for example, based on the comparison output of the comparator 103. Particularly, in the power supply circuit in the first embodiment, the oscillation frequency of the oscillator 101 is controlled based on the output from the frequency control circuit 102. Therefore, the pulse control circuit 104 controls an ON/OFF period, i.e., a frequency together with a duty ratio that is a ratio of an ON/OFF time of the MOS switch 105. The detail of the frequency control circuit 102 characteristic of this embodiment is described later.

One end of the MOS switch 105 is connected to one end of a coil 106 and an anode of a diode 107, and the other end of the MOS switch 105 is grounded. The other end of the coil 106 is supplied with an input voltage that is a power source of the power supply circuit. The power supply circuit boosts the input voltage by charging the coil 106 with charges corresponding to the input voltage and discharging the charged charges. A capacitor 108 using a well-known capacitor, for example, is connected to a cathode of the diode 107. The capacitor 108 stores the charges boosted by the coil 106 and outputs an inter-terminal voltage generated due to the storage of the charges as the output voltage.

In the frequency control circuit 102 of this embodiment, a register (storage means) (not shown) is provided, and the register stores values of an effective display start line, an effective display end line, an effective display start dot, an effective display end dot, and the like. The frequency control circuit 102 sets a high-load period and a low-load period in accordance with the vertical synchronizing signal and the horizontal synchronizing signal, and the register value. Further, the value of the register may be rewritten from outside. Further, an effective data signal indicating an effective display period for one horizontal line may be input to the frequency control circuit 102, and the frequency control circuit 102 may perform control based on the effective data signal.

Figure 2A:
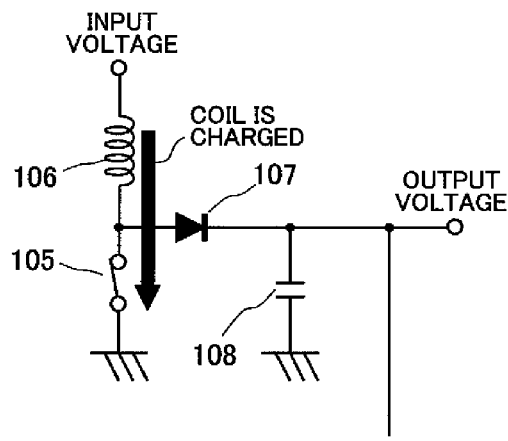
FIG. 2A is a diagram illustrating a charging operation of a coil in the power supply circuit in the first embodiment of the present invention.
Figure 2B:
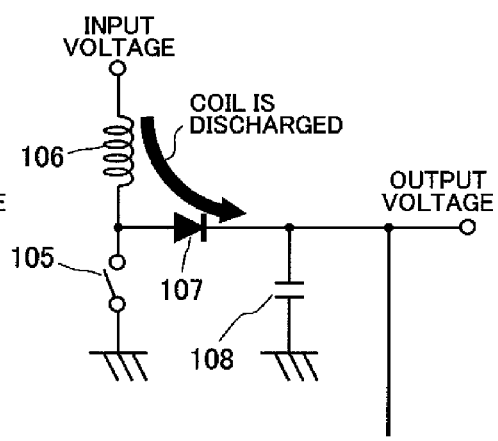
FIG. 2B is a diagram illustrating a discharging operation of a coil in a power supply circuit in the first embodiment of the present invention.

FIGS. 2A and 2B are diagrams illustrating a charging/discharging operation in the power supply circuit in the first embodiment of the present invention, and FIG. 3 is a diagram illustrating a relationship between the control signal of the MOS switch, and the output voltage and the input current in the power supply circuit in the first embodiment of the present invention. FIG. 2A is a diagram illustrating an operation when the MOS switch is in an ON state, and FIG. 2B is a diagram illustrating an operation when the MOS switch is in an OFF state.

Hereinafter, the basic operation of the power supply circuit in the first embodiment illustrated in FIG. 1 is described with reference to FIGS. 2A, 2B, and 3.

As illustrated in FIG. 3, a control signal 303 for the MOS switch 105 generated in the pulse control circuit 104 becomes "HIGH" in a period t1 to t2 in which the output voltage value 301 that is fed back is smaller than a voltage value of the clock signal 302 generated by the oscillator 101, and the MOS switch 105 is turned on. When the MOS switch 105 is in an ON state, a circuit in which a current from the input voltage is grounded via the coil 106 and the MOS switch 105 is formed, and as indicated by an arrow in FIG. 2A, the coil 106 is charged. The anode potential of the diode 107 at this time becomes a ground potential, and the output voltage is supplied from the capacitor 108 due to the function of the diode 107. In the period t1 to t2, charges are not supplied to the capacitor 108, and hence, the output voltage 301 drops.

On the other hand, in a period t2 to t4 in which the output voltage value 301 is larger than the voltage value of the clock signal 302, the control signal 303 of the MOS switch 105 becomes "LOW", and the MOS switch 105 is turned off. When the MOS switch 105 is in an OFF state, a circuit from the coil 106 to the ground via the diode 107 and the capacitor 108 is formed, and as indicated by an arrow in FIG. 2B, the charges accumulated in the coil 106 is supplied to the capacitor 108 via the diode 107 and is output as the output voltage 301. Here, in a period t2 to t3, the charges accumulated in the coil 106 are supplied to the capacitor 108, i.e., the output voltage 301. Therefore, as illustrated in FIG. 3, the output voltage 301 is increased. In contrast, in a period t3 to t4, the charging of the charges accumulated in the coil 106 is completed, and hence, the output voltage 301 is supplied from the capacitor 108. In the period t3 to t4, the charges are not supplied to the capacitor 108, and hence the output voltage 301 drops.

The operation in a period t4 to t5 is the same as that in the period t1 to t2. Thereafter, the charging/discharging operation in the period t1 to t4 is repeated, whereby the output voltage 301 of a voltage value higher than the input voltage of the power supply circuit is supplied.

Figure 5A:
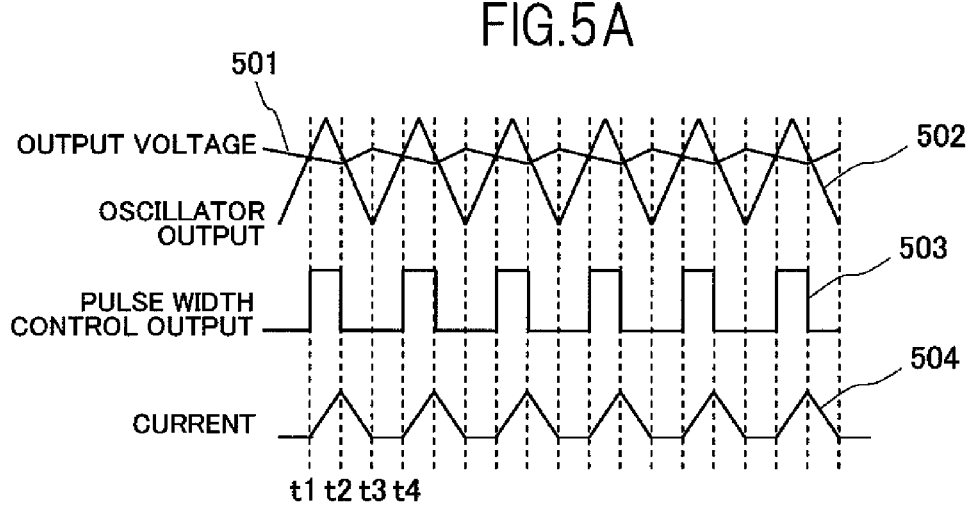
FIG. 5A is a diagram illustrating a relationship between the control signal of the MOS switch, and the output voltage and the input current at a low load in the power supply circuit in the first embodiment of the present invention and the conventional power supply circuit.
Figure 5B:
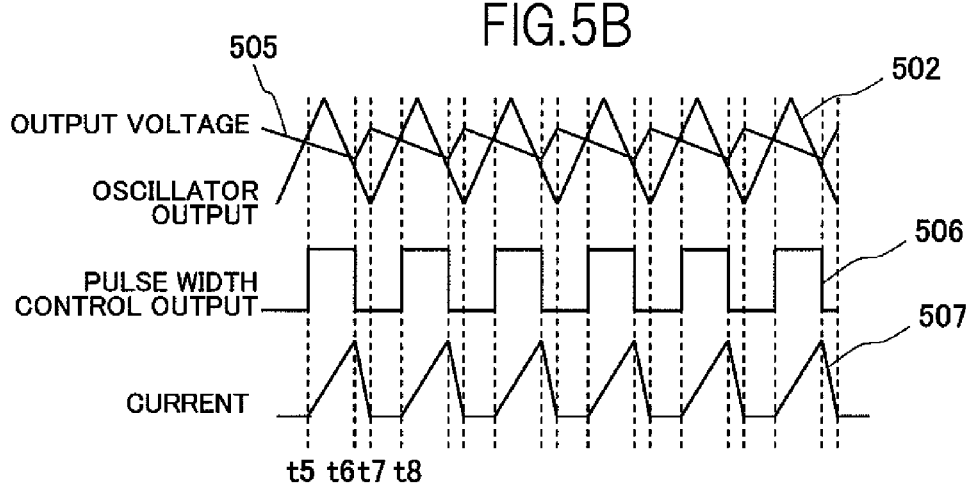
FIG. 5B is a diagram illustrating a relationship between the control signal of the MOS switch, and the output voltage and the input current at a high load in the conventional power supply circuit.
Figure 5C:
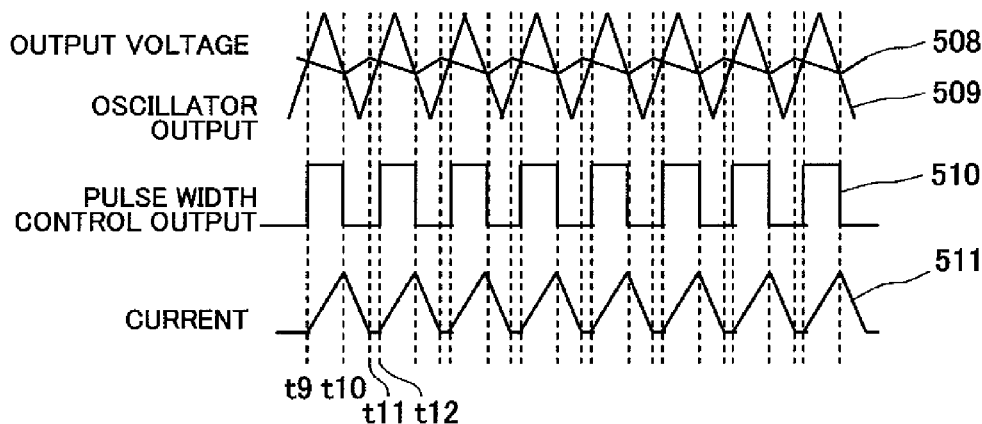
FIG. 5C is a diagram illustrating a relationship between the control signal of the MOS switch, and the output voltage and the input current at a high load in the power supply circuit in the first embodiment of the present invention.

Next, the operation of enhancing power efficiency in the power supply circuit in the first embodiment is described. FIGS. 4A and 4B are diagrams illustrating a relationship between the output voltage and the input current at a low load and at a high load in the conventional power supply circuit. FIG. 4A illustrates a relationship between an output voltage 401 and an input current 402 at a low load, and FIG. 4B illustrates a relationship between an output voltage 403 and an input current 404 at a high load. In FIGS. 4A and 4B, a relationship: voltage V2>voltage V1 is satisfied. FIGS. 5A to 5C are diagrams illustrating a relationship between the control signal of the MOS switch, and the output voltage and the input current in the power supply circuit in the first embodiment of the present invention and the conventional power supply circuit. FIG. 5A illustrates a relationship between a control signal 503 of the MOS switch, and an output voltage 501 and an input current 504 at a low load in the conventional power supply circuit. FIG. 5B illustrates a relationship between a control signal 506 of the MOS switch, and an output voltage 505 and an input current 507 at a high load in the conventional power supply circuit. FIG. 5C illustrates a relationship between a control signal 510 of the MOS switch, and an output voltage 508 and an input current 511 at a high load in the power supply circuit in the first embodiment.

As illustrated in FIGS. 4A and 4B, in the conventional power supply circuit, the frequency of a clock signal from the oscillator is fixed. At a low load illustrated in FIG. 4A, the drop in voltage of the output voltage 401 in the period T1-T3 is up to a voltage V2, and at this time, a MOS switch (not shown) is turned on in the period T2-T3, and the input current 402 from the power source of the power supply circuit flows through the coil, and the coil is charged. In the next period T3-T4, the MOS switch (not shown) is turned off, and an electromotive force is generated in the coil. The charges caused by the electromotive force are supplied to a capacitor (not shown) and is output as the output voltage 401. The power efficiency at this time is a value ((2a)/(1a)) obtained by dividing an integral value (area of (2a) in FIG. 4A) of a current during a discharging period by an integral value (area of (1a) in FIG. 4A) of a current during a charging period.

On the other hand, as illustrated in FIG. 4B, at a high load, the time during which the coil is charged, i.e., the ON time of the MOS switch (not shown) becomes long, and hence the output voltage 403 in the period T5 to T7 drops to the voltage V1. In the period T6 to T7, the MOS switch (not shown) is turned on, and the input current 404 in a larger amount than that at a low load illustrated in FIG. 4A flows through the coil, and the coil is charged. In the next period T7 to T8, the MOS switch (not shown) is turned off, and an electromotive force larger than that at a low load is generated in the coil. The charges caused by the electromotive force are supplied to the capacitor (not shown) and are output as the output voltage 403. The input current 404 at this time becomes a larger electromotive force within a short period of time, compared with that at a low load, and hence, the slope thereof becomes large. The power efficiency in this case is a value ((2b)/(1b)) obtained by dividing an integral value (area of (2b) in FIG. 4B) of a current during a discharging period by an integral value (area (1b) in FIG. 4B) of a current during a charging period, and the power efficiency decreases largely compared with the value at a low load.

Thus, if the drop amount of a voltage during a high-load period is decreased, the power efficiency may be enhanced. In the invention of the present application, the period T5 to T6 which is a drop period of the output voltage 403 and does not contribute to the charging operation is decreased, and the charging period during a high-load period is shortened, whereby the power efficiency is enhanced.

Hereinafter, the effects thereof are described with reference to FIGS. 5A to 5C.

As illustrated in FIG. 5A, the decrease in the output voltage 501 is small at a low load, and hence the time required for charging the coil, i.e., the HIGH period (period t1 to t2) of a pulse width control output 503, which is an ON time of the MOS switch becomes short, and the period t2 to t3 in which the charges accumulated in the coil are supplied to the capacitor becomes similar in length to the period t1 to t2. Consequently, as described in FIG. 4A, the power efficiency becomes satisfactory.

However, as illustrated in FIG. 5B, in the case where an output 502 of the oscillator at a high load is set to be the same at a low load, the decrease in the output voltage 505 becomes large at a high load, and hence, a pulse width control output 506 that is a time required for charging the coil becomes a period t5 to t6 that is longer than that at a low load by the PWM control. Consequently, the input current 507 increases, and the charges accumulated in the coil increase, compared with those at a low load. On the other hand, in a period t6 to t7 in which the pulse width control output 506 becomes LOW, i.e., in a period in which the MOS switch (not shown) is turned off and the charges accumulated in the coil are supplied to the capacitor becomes shorter than that at a low load. Therefore, as descried with reference to FIG. 4B, the power efficiency is degraded.

Compared with the conventional system described above in which the oscillator output 502 is fixed, in the power supply circuit in the first embodiment, the frequency of the oscillator output 509 becomes high based on the output from the frequency control circuit at a high load. Therefore, as illustrated in FIG. 5C, even in the case where the decrease (slope) of the output voltage 508 is large, a period t9 to t10 in which the pulse width control output 510 becomes HIGH, i.e., a period in which the MOS switch (not shown) is turned on, and the coil is charged becomes shorter than that in the conventional example. Consequently, even at a high load, the amount of charges to be supplied to the coil and the amount of charges output from the capacitor may be reduced in the period t9 to t10, and a period t10 to t11 for supplying the charges accumulated in the coil to the capacitor may also be set to be a sufficiently long period compared with that in the case of FIG. 5B. More specifically, at a high load illustrated in FIG. 5C, the charging time of the coil is shortened and the drop amount of the output voltage is reduced by increasing the frequency of a clock signal. Thus, the power efficiency that is a value obtained by dividing an integral value of a current during a discharging period by an area of an integral value of a current during a charging period may be enhanced compared with that in the conventional example.

Figure 6:
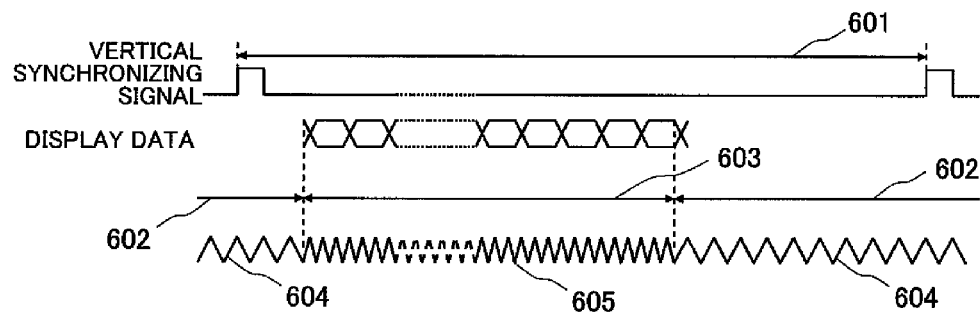
FIG. 6 is a diagram illustrating an operation in the case where a high-load period is set to be a display effective period in the power supply circuit in the first embodiment of the present invention.
Figure 7:
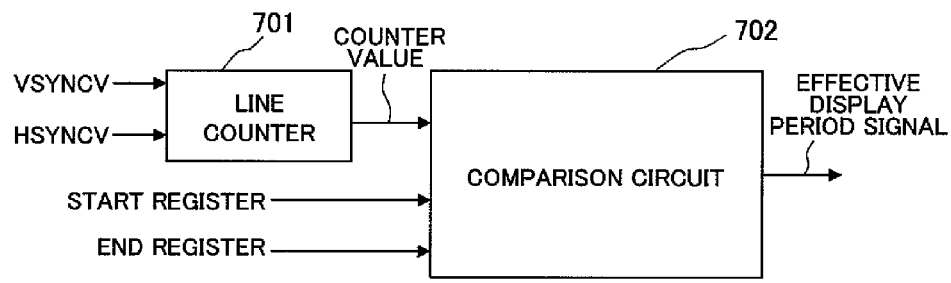
FIG. 7 is a diagram illustrating an example of a frequency control circuit in the power supply circuit in the first embodiment of the present invention.

FIG. 6 is a diagram illustrating an operation in the case where a high-load period is set to be a display effective period in the power supply circuit of the first embodiment of the present invention. FIG. 7 is a diagram illustrating one example of a frequency control circuit in the power supply circuit of the first embodiment of the present invention.

As illustrated in FIG. 6, the power supply circuit of this embodiment divides one frame period 601 of a vertical synchronizing signal into a display effective period 603 and a vertical retrace period 602 based on the vertical synchronizing signal and a horizontal synchronizing signal that are signals for driving a display panel (for example, liquid crystal display panel) (not shown) supplied with power from the power supply circuit, and switches the frequency of the power supply circuit between the display effective period 603 and the vertical retrace period 602. More specifically, in the display effective period 603 in the one frame period 601, a write operation of display data to the display panel (not shown) is performed, and hence, the power amount to be consumed by the display panel becomes larger compared with that in the vertical retrace period 602. Therefore, in the power supply circuit of the first embodiment, as illustrated in FIG. 6, by setting the frequency of a clock signal output 605 of the oscillator in the display effective period 603 to be higher than the frequency of a clock signal output 604 of the oscillator in the vertical retrace period 602, the power efficiency is enhanced. The frequencies of the clock signal outputs 604 and 605 illustrated in FIG. 6 are illustrated schematically, which are different from an actual frequency.

The frequency control circuit at this time includes a line counter 701 and a comparison circuit 702, as illustrated in FIG. 7. The line counter 701 is reset by a high level of a vertical synchronizing signal VSYNCV, and the high level number of a horizontal synchronizing signal HSYNCV is counted (a count value is incremented on a one-by-one basis). Based on a count value obtained in the line counter 701, a value of the START register that is a register storing an effective display start line number, and a value of an END register that is a register storing an effective display end line number, the comparison circuit 702 outputs a signal (e.g., high level signal) for increasing a frequency of the frequency control circuit to a frequency control circuit as an effective display period signal. The comparison circuit 702 at this time compares a count value of the line counter 701 with a value of the START register and a value of an END register respectively, and determines as the effective display period 603 the case where the count value of the line counter 701 is larger than the value of the START register, and the count value of the line counter 701 is smaller than the value of the END register, and outputs a high level indicating the effective display period signal. On the other hand, the period which is not determined as the effective display period 603 is considered as the vertical retrace period or a period corresponding to the vertical retrace period, and the comparison circuit 702 outputs a low level. With this configuration, in the display effective period 603 in which the write operation of display data is performed, the frequency of the clock signal output 605 of the oscillator may be set to be a high frequency to enhance power efficiency.

As described above, the power supply circuit of the first embodiment of the present invention includes the coil 106 to be charged with the charges corresponding to the input voltage, the MOS switch 105 for controlling the charging/discharging of the coil 106, the diode 107 for rectifying the flow of the charges from the coil 106, the capacitor 108 for stabilizing an output voltage in an ON state of the MOS switch 105, the oscillator 101 for generating a clock signal to be the reference of the charging/discharging operation of the coil 106 and the capacitor 108, the comparator 103 for comparing a clock signal and the output voltage, the pulse control circuit 104 for controlling the ON/OFF of the MOS switch 105 in accordance with the output signal of the comparator 103, and the frequency control circuit 102 for using as external signals the vertical synchronizing signal and the horizontal synchronizing signal in the display panel to which the power supply circuit supplies power and changing dynamically the frequency of a clock signal in accordance with the external signals, and the frequency of the clock signal output 605 of the oscillator is set to be a high frequency in the display effective period 603 in which the write operation of display data is performed. Therefore, the decrease in power efficiency at a high load of the output voltage may be prevented, and consequently, the power efficiency in the entire operation period including periods other than the display effective period 603 may be enhanced.

In the display device of the first embodiment, the comparator 103 compares the output voltage and a clock signal generated in the oscillator. However, the present invention is not limited thereto. A reference voltage may be generated in advance, and the comparator 103 compares the reference voltage and the output voltage.

Second Embodiment

Figure 8:
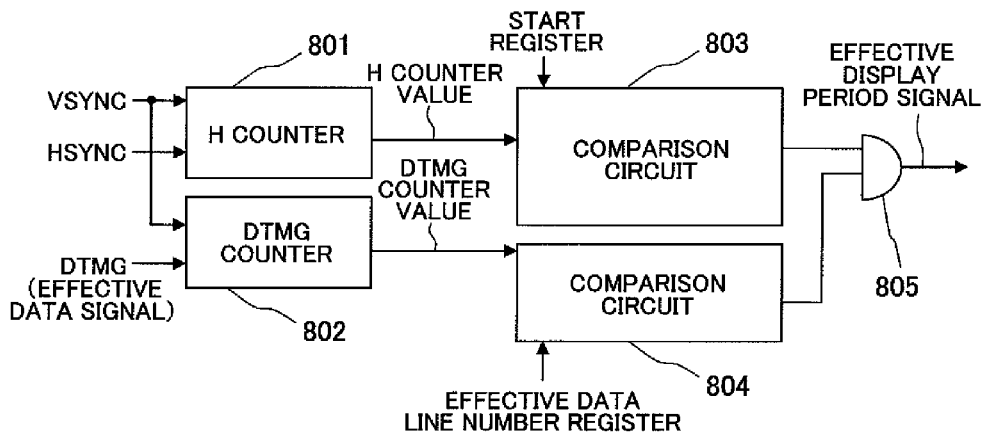
FIG. 8 is a diagram illustrating a schematic configuration of a frequency control circuit in a power supply circuit in a second embodiment of the present invention.

FIG. 8 is a diagram illustrating a schematic configuration of a frequency control circuit in a power supply circuit of a display device according to a second embodiment of the present invention. In the power supply circuit of the second embodiment, the configuration other than the frequency control circuit is similar to that of the first embodiment. Thus, in the following description, only the frequency control circuit of the second embodiment is described in detail.

As illustrated in FIG. 8, the frequency control circuit of the second embodiment includes an H counter 801 for inputting a vertical synchronizing signal VSYNCV and a horizontal synchronizing signal HSYNCV, a DTMG counter 802 for inputting the vertical synchronizing signal VSYNCV and an effective data signal DTMG, a comparison circuit 803 for inputting a count value of the H counter 801, a comparison circuit 804 for inputting a count value of the DTMG counter 802, and an AND circuit 805 having two inputs. It should be noted that, in the frequency control circuit illustrated in FIG. 8, the effective data signal DTMG is a signal indicating an effective display period for one horizontal line.

In the same way as in the line counter 701 of the first embodiment, the count value of the H counter 801 is set by the high level of the vertical synchronizing signal VSYNCV, and the H counter 801 counts a high level number of the horizontal synchronizing signal HSYNCV (increments a count value on a one-by-one basis). Further, the DTMG counter 802 is reset by the high level of the vertical synchronizing signal VSYNCV, and counts a high level number of the effective data signal DTMG (increments a count value on a one-by-one basis). Based on the count value (H counter value) obtained by the H counter 801 and the value of the START register that is a register for storing an effective display start line, the comparison circuit 803 outputs a high level signal for increasing a frequency of a frequency control circuit to the AND circuit 805. Based on the count value (DTMG counter value) obtained by the DTMG counter 802 and the value of the START register that is a register for storing an effective display start line, the comparison circuit 804 outputs a high level signal for increasing the frequency of the frequency control circuit to the AND circuit 805. Consequently, only in the period in which both the outputs from the H counter 801 and the DTMG counter 802 are at a high level, the AND circuit 805 outputs a high level (effective display period signal) indicating an effective display period, and outputs a low level in the other periods.

As described above, by using the frequency control circuit of the second embodiment, the frequency of the clock signal output 605 of the oscillator may be set to be a high frequency in the display effective period 603 in which a write operation of display data is performed, and hence, the same effect as the above-mentioned effect in the first embodiment may be obtained. Particularly, in the power supply circuit of the second embodiment, the effective display period 603 is determined based on the effective data signal DTMG together with the vertical synchronizing signal VSYNCV and the horizontal synchronizing signal HSYNCV. Therefore, remarkable effects may be obtained in which the display effective period 603 may be determined more precisely, and the power efficiency may be enhanced more than that in the power supply circuit of the first embodiment.

Third Embodiment

Figure 9:
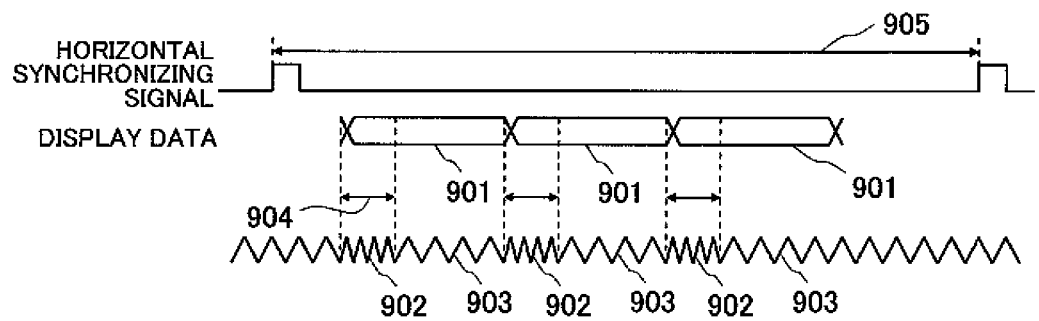
FIG. 9 is a diagram illustrating an operation in the case where a high-load period is set to be a display effective period in a power supply circuit in a third embodiment of the present invention.
Figure 10:
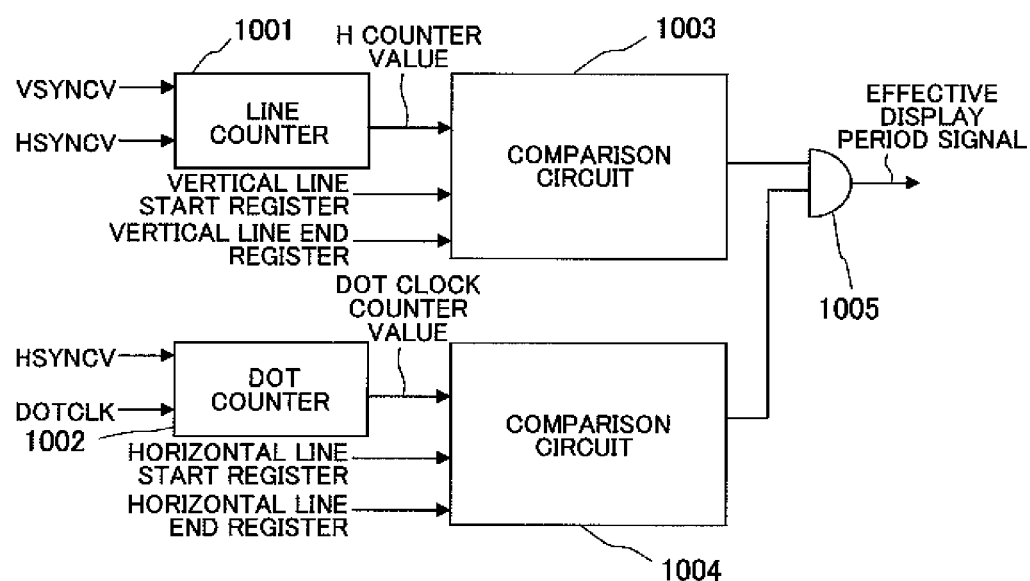
FIG. 10 is a diagram illustrating an example of a frequency control circuit in the power supply circuit in a third embodiment of the present invention.

FIG. 9 is a diagram illustrating the operation performed when a high-load period is set to be a display effective period in a power supply circuit of a display device according to a third embodiment of the present invention. FIG. 10 is a diagram illustrating one example of a frequency control circuit in the power supply circuit of the third embodiment of the present invention. Particularly, FIG. 9 is a diagram illustrating a frequency of a clock signal in an RGB time-division driving system in which one horizontal synchronizing period 905 is divided into three periods, and R data, G data, and B data corresponding to respective sub-pixels of red (R), green (G), and blue (B) are successively applied in each divided period 901. Further, in the power supply circuit of the third embodiment, the configuration other than the frequency control circuit is the same as that of the first embodiment. Thus, in the following description, only the frequency control circuit of the third embodiment is described in detail.

As illustrated in FIG. 9, the power supply circuit of the third embodiment changes a clock signal frequency of an oscillator in each period obtained by dividing one horizontal synchronizing period into three periods, which is characteristic of the RGB time-division driving system, based on the vertical synchronizing signal, the horizontal synchronizing signal, and the dot clock that are signals for driving a display panel (not shown) to which the power supply circuit supplies power. In a signal rising period 904 for outputting each data of R, G, and B, i.e., in a data voltage application period, a current consumption of the display panel becomes largest, and hence, the frequency of the clock signal output 902 is increased. Further, in the case where the potential of a pixel approaches the data voltage after the elapse of a predetermined time after the signal rising, more specifically, in a retention period of display data (data voltage retention period), the power consumption of the display panel decreases, and hence, the power supply circuit decreases the frequency of the clock signal output 903. In the signal rising period 904 in which writing of display data of R, G, and B of the display panel is started in the one horizontal synchronizing period 905, display data is output to a drain line to which each sub-pixel of the display panel is connected, display data is written in each pixel, and the like. Therefore, the power consumption amount increases. In the signal rising period 904 in which the power consumption amount increases, the power supply circuit of this embodiment sets the frequency of the clock signal output 902 of the oscillator to be higher than the frequency in the period 903 other than the signal rising period 904, whereby power efficiency is enhanced. The frequencies of the clock signal outputs 902 and 903 illustrated in FIG. 9 are illustrated schematically, which are different from an actual frequency.

As illustrated in FIG. 10, the frequency control circuit of the third embodiment includes a line counter 1001 for inputting a vertical synchronizing signal VSYNCV and a horizontal synchronizing signal HSYNCV, a dot counter 1002 for inputting the horizontal synchronizing signal HSYNCV and a dot clock DOTCLK, a comparison circuit 1003 for inputting a count value (H count value) of the line counter 1001, a value of a vertical line START register that is a register for storing an effective display start line, and a value of a vertical line END register that is a register for storing an effective display end line number, a comparison circuit 1004 for inputting a count value (dot clock counter value) of the dot counter 1002, a value of a horizontal line START register that is a register for storing an effective display start dot, and a value of a horizontal line END register that is a register for storing an effective display end dot number, and an AND circuit 1005 having two inputs.

In the same way as in the line counter 701 of the first embodiment, the count value of the line counter 1001 is reset by a high level of the vertical synchronizing signal VSYNCV, and the line counter 1001 counts a high level number of the horizontal synchronizing signal HSYNCV (increments a count value on a one-by-one basis).

The dot counter 1002 is reset by a high level of the horizontal synchronizing signal HSYNCV and counts a dot clock number (increments a count value on a one-by-one basis).

The comparison circuit 1003 outputs a high level signal for increasing a frequency of the frequency control circuit to the AND circuit 1005, based on the count value obtained by the line counter 1001, the value of the vertical line START register, and the value of the vertical line END register. The comparison circuit 1003 compares the count value of the line counter 1001 with the value of the vertical line START register and the value of the vertical line END register, respectively. As a result of the comparison, the case where the count value of the line counter 1001 is larger than the value of the vertical line START register, and the count value of the line counter 1001 is smaller than the value of the vertical line END register is determined as the effective display period, and a high level indicating the effective display period is output. In a period which is not determined as the effective display period, a low level is output.

The comparison circuit 1004 outputs a high level signal for increasing a frequency of the frequency control circuit to the AND circuit 1006, based on the count value obtained by the dot counter 1002, the value of the horizontal line START register, and the value of the horizontal line END register. The comparison circuit 1004 compares the count value of the dot counter 1002 with the value of the horizontal line START register and the value of the horizontal line END register, respectively. As a result of the comparison, the case where the count value of the dot counter 1002 is larger than the value of the horizontal line START register, and the count value of the dot counter 1002 is smaller than the value of the horizontal line END register is determined as the signal rising period 904, and a high level is output. In a period which is not determined as the signal rising period 904, a low level is output. For simplicity of the description, the configuration of the frequency control circuit illustrated in FIG. 10 corresponds to one sub-pixel of three sub-pixels of R, G, and B. Thus, in order to control the frequency when display data is written in sub-pixels of respective colors of R, G, and B, a number of the comparison circuits 1004 are required, the number at least corresponding to the number of sub-pixels of respective colors of R, G, and B.

Thus, by using the frequency control circuit of the third embodiment, in the three signal rising periods 904 in one horizontal period in which a write operation for each of R, G, and B is performed, the frequency of the clock signal output 902 of the oscillator may be set to be higher than that of the clock signal output 903 in the other periods. This may prevent the decrease in power efficiency at a high load of an output voltage, and consequently, the power efficiency of the power supply circuit may be enhanced in the entire operation period including periods other than the signal rising period 904.

Fourth Embodiment

Figure 11:
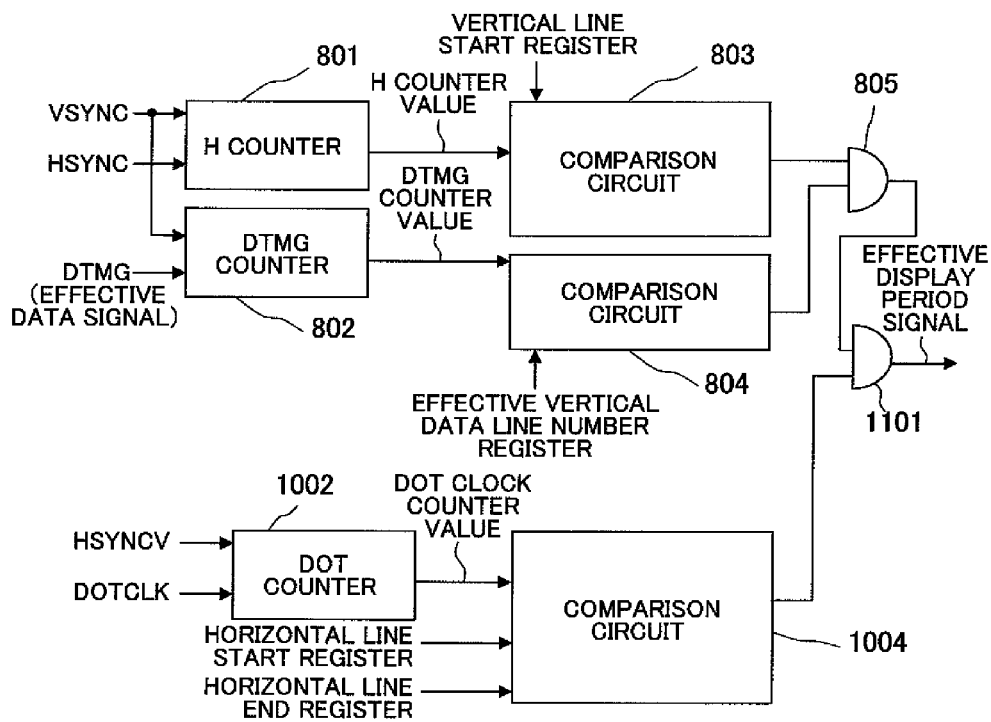
FIG. 11 is a diagram illustrating a schematic configuration of a frequency control circuit in a power supply circuit in a fourth embodiment of the present invention.

FIG. 11 is a diagram illustrating a schematic configuration of a frequency control circuit in a power supply circuit of a display device according to a fourth embodiment of the present invention. In the power supply circuit of the fourth embodiment, the configuration other than the frequency control circuit is similar to that of the power supply circuit of the third embodiment. Thus, in the following description, only the frequency control circuit of the fourth embodiment is described in detail.

As illustrated in FIG. 11, the frequency control circuit of the fourth embodiment includes an H counter 801 for inputting a vertical synchronizing signal VSYNCV and a horizontal synchronizing signal HSYNCV, a DTMG counter 802 for inputting the vertical synchronizing signal VSYNCV and an effective data signal DTMG, a comparison circuit 803 for inputting a count value of the H counter 801, a comparison circuit 804 for inputting a count value of the DTMG counter 802, an AND circuit 805 having two inputs, a dot counter 1002 for inputting the horizontal synchronizing signal HSYNCV and a dot clock DOTCLK, a comparison circuit 1004 for inputting a count value of the dot counter 1002, a value of the horizontal line START register, and a value of a horizontal line END register, and an AND circuit 1101 having two inputs.

As is apparent from FIG. 11, only in the case where a high level which is output from the AND circuit 805 and indicates the display effective period determined precisely and a high level indicating the signal rising period 904 in which the power consumption is largest due to a write operation of display data, the frequency control circuit of the fourth embodiment outputs a high level. The configuration of the frequency control circuit illustrated in FIG. 10 corresponds to one sub-pixel of three sub-pixels of RGB, for simplicity of the description. Thus, in order to control a frequency when display data is written in sub-pixels of respective colors of RGB, a number of the comparison circuits 1004 are required, the number at least corresponding to the number of sub-pixels of respective colors of RGB.

Thus, by using the frequency control circuit of the fourth embodiment, the three signal rising periods 904 of one horizontal period in which a write operation for each RGB is performed may be specified precisely, and in the signal rising period 904, the frequency of the clock signal output 902 of the oscillator may be set to be higher than that of the clock signal output 903 in the other periods. This may prevent the decrease in power efficiency at a high load of an output voltage, and consequently, the power efficiency of the power supply circuit may be enhanced in the entire operation period including periods other than the signal rising period 904.

Fifth Embodiment

Figure 12:
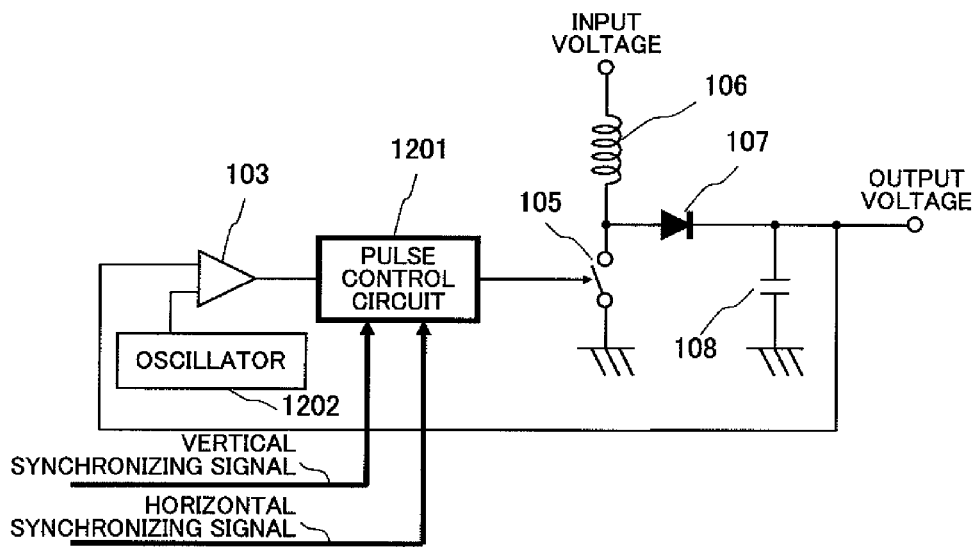
FIG. 12 is a diagram illustrating a schematic configuration of a power supply circuit in a fifth embodiment of the present invention.

FIG. 12 is a diagram illustrating a schematic configuration of a power supply circuit of a display device according to a fifth embodiment of the present invention. As illustrated in FIG. 12, the power supply circuit of the fifth embodiment includes a pulse control circuit 1201 for inputting a vertical synchronizing signal and a horizontal synchronizing signal and controlling the period in which the MOS switch 105 is turned on/off based on the vertical synchronizing signal, the horizontal synchronizing signal, and the output of the comparator 103. A clock signal from an oscillator 1202 and an output voltage are input to the comparator 103, and based on the comparison output of the comparator 103, the pulse control circuit 1201 of the fifth embodiment controls the ON/OFF of the MOS switch 105. The detail of the pulse control circuit 1201 that is characteristic of this embodiment is described later. Further, as described above, in this embodiment, the frequency of the clock signal output from the oscillator 1202 is set to be the period set in the pulse control circuit 1201, i.e., the frequency corresponding to the pulse width control output.

The other configuration is the same as that of the first embodiment. One end of the MOS switch 105 is connected to one end of the coil 106 and the anode of the diode 107, and the other end of the MOS switch 105 is grounded. The other end of the coil 106 is supplied with an input voltage that is a power source of the power supply circuit. The power supply circuit boosts the input voltage by charging the coil 106 with charges corresponding to the input voltage and discharging the charged charges. The capacitor 108 using a well-known capacitor, for example, is connected to the cathode of the diode 107. The capacitor 108 stores the charges boosted by the coil 106 and outputs an inter-terminal voltage generated due to the storage of the charges as the output voltage.

A register is provided in the pulse control circuit 1201 of this embodiment, and values of an effective display start line, an effective display end line, an effective display start dot, an effective display end dot, and the like are stored in the register. The pulse control circuit 1201 sets a high-load period and a low-load period in accordance with the vertical synchronizing signal and the horizontal synchronizing signal, and the register value. Further, the value of the register may be rewritten from the outside. Further, an effective data signal indicating an effective display period for one horizontal line may be input to the pulse control circuit 1201, and the pulse control circuit 1201 may perform control based on the effective data signal.

Next, the operation of enhancing power efficiency in the power supply circuit of the fifth embodiment is described. FIGS. 13A to 13C are diagrams illustrating a relationship of the control signal of the MOS switch with the output voltage and the input current in the power supply circuit of the fifth embodiment of the present invention and the conventional power supply circuit. FIG. 13A illustrates a relationship of a control signal (pulse width control output) 1303 of the MOS switch with an output voltage 1301 and an input current 1304 at a low load in the conventional power supply circuit, and FIG. 13B illustrates a relationship of a control signal 1306 of the MOS switch with an output voltage 1305 and an input current 1307 at a high load in the conventional power supply circuit. FIG. 13C illustrates a relationship of a control signal 1310 of the MOS switch with an output voltage 1308 and an input current 1311 at a high load in the power supply circuit of the fifth embodiment.

As illustrated in FIG. 13A, the decrease in the output voltage 1301 is small at a low load, and hence the time required for charging the coil, i.e., the HIGH period (period t1 to t2) of the pulse width control output 1303 that is the ON time of the MOS switch 105 becomes short, and the period t2 to t3 in which the charges accumulated in the coil are supplied to the capacitor becomes similar to the period t1 to t2. Consequently, as described in the first embodiment, the power efficiency becomes satisfactory.

However, as illustrated in FIG. 13B, in the case where the output 1302 of the oscillator at a high load is set to be the same as that at a low load, the decrease in the output voltage 1305 increases at a high load. Therefore, the pulse width control output 1306 that is the time required for charging the coil becomes a period t5 to t6 that is longer than that at a low load by the PWM control. Consequently, compared with that at a low load, the input current 1307 increases, and the charges to be accumulated in the coil increase. On the other hand, a period t6 to t7 in which the pulse width control output 1306 becomes LOW, i.e., a period in which the MOS switch (not shown) is turned off and the charges accumulated in the coil are supplied to the capacitor becomes shorter than that at a low load. Therefore, as described in the first embodiment, the power efficiency is degraded.

Compared with the conventional system described above in which a period of a pulse width control output is fixed, in the power supply circuit of the fifth embodiment, the period of the pulse width control output 1310 output from the pulse control circuit 1201 at a high load is set to be a half of the period at a low load. Therefore, the period of the oscillator output 1309 is also set to be a half of the period at a low load. In this case, as illustrated in FIG. 13C, charging/discharging is performed twice in a T1 period that corresponds to the conventional one period, and hence, even in the case where the decrease (slope) of the output voltage 1308 is large, the period in which the pulse width control output 1310 becomes HIGH, which is the time required for charging the coil, i.e., periods t9 to t10 and t11 to t12 in which the MOS switch (not shown) is turned on become shorter compared with that in the conventional example. Consequently, even at a high load, the amount of charges to be supplied to the coil and the amount of charges to be output from the capacitor may be decreased in the periods t9 to t10 and t11 to t12. Further, the number of periods in which the capacitor is charged with the charges accumulated in the coil become twice, that is, in periods t10 to t11 and t12 to t13. In this embodiment, the time for charging the coil may be shortened and the drop amount of the output voltage may be reduced, and the power efficiency obtained by dividing an integral value of a current during a discharging period by an area of the integral value of a current during a charging period may be enhanced compared with the conventional example.

Figure 14:
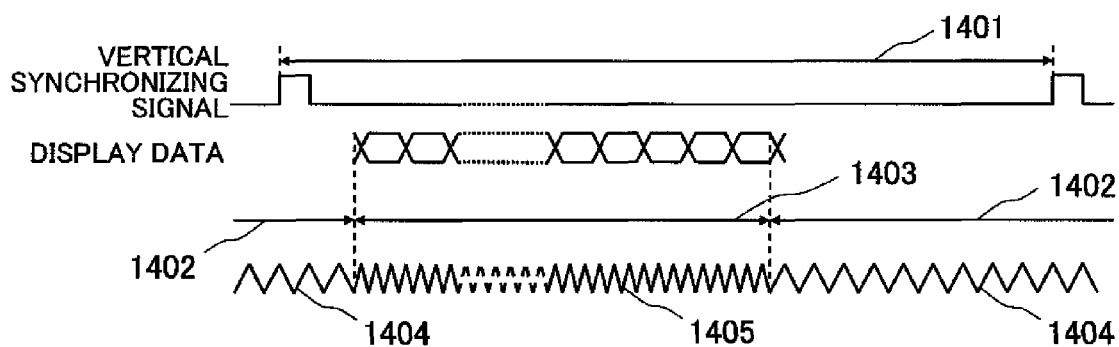
FIG. 14 is a diagram illustrating an operation in the case where a high-load period is set to be a display effective period in the power supply circuit in the fifth embodiment of the present invention.

FIG. 14 is a diagram illustrating an operation performed when a high-load period is set to be a display effective period in the power supply circuit of the fifth embodiment of the present invention. As illustrated in FIG. 14, the power supply circuit of the fifth embodiment divides one frame period 1401 into a display effective period 1403 and the other period including a vertical retrace period 1402, based on the vertical synchronizing signal and the horizontal synchronizing signal that are signals for driving a display panel (not shown) that is supplied with power by the power supply circuit, and switches a period required for charging/discharging the power supply circuit between the two periods. More specifically, in the display effective period 1403 of the one frame 1401, a write operation of display data to a display panel (not shown) is performed. Therefore, the power to be consumed by the display panel becomes larger, compared with that in the period including the vertical retrace period 1402 (hereinafter, simply referred to as a vertical retrace period) other than the display effective period 1403. In the power supply circuit of the fifth embodiment, as illustrated in FIG. 14, the period of the pulse width control output in the display effective period 1403 with respect to the period of the pulse width control output in the vertical retrace period 1402 is halved, whereby the power efficiency is enhanced. The pulse width control output illustrated in FIG. 14 is illustrated schematically, which is different from an actual period.

The pulse control circuit at this time includes a circuit similar to the frequency control circuit of the first embodiment, and varies the period of the pulse width control output in accordance with the output of the circuit. Thus, in the following, the detailed description thereof is omitted.

As described above, the power supply circuit of the fifth embodiment of the present invention includes the coil 106 that is charged with charges corresponding to the input voltage, the MOS switch 105 that controls the charging/discharging of the coil 106, the diode 107 that rectifies the flow of the charges from the coil 106, the capacitor 108 for stabilizing the output voltage when the MOS switch 105 is in an ON state, the oscillator 1202 for generating a clock signal to be the reference of the charging/discharging operations of the coil 106 and the capacitor 108, the comparator 103 for comparing a clock signal with the output voltage, and the pulse control circuit 1201 for varying the period of the pulse width control output that controls the ON/OFF of the MOS switch 105 to a half, in accordance with external signals such as the vertical synchronizing signal and the horizontal synchronizing signal of the display panel that is supplied with power by the power supply circuit and an output signal from the comparator 103, and the period of the pulse width control signal is decreased in the display effective period 1403 in which a write operation of display data is performed. Therefore, the decrease in power efficiency at a high load of the output voltage may be prevented, and consequently, the power efficiency in the entire operation period including the period other than the display effective period 1403 may be enhanced.

In the power supply circuit of the fifth embodiment, as means for varying the period of the pulse width control output that is output from the pulse control circuit 1201, an output of a circuit similar to the frequency control circuit of the first embodiment is used. However, the present invention is not limited thereto. Even in the case of using a circuit similar to the frequency control circuit of the second embodiment, the effects described above may be obtained. Further, in the fifth embodiment, the period of the pulse width control signal is halved, but the present invention is not limited thereto, and 1/n (where n is a natural number equal to or larger than 2) or smaller may be applied.

Sixth Embodiment

Figure 15:
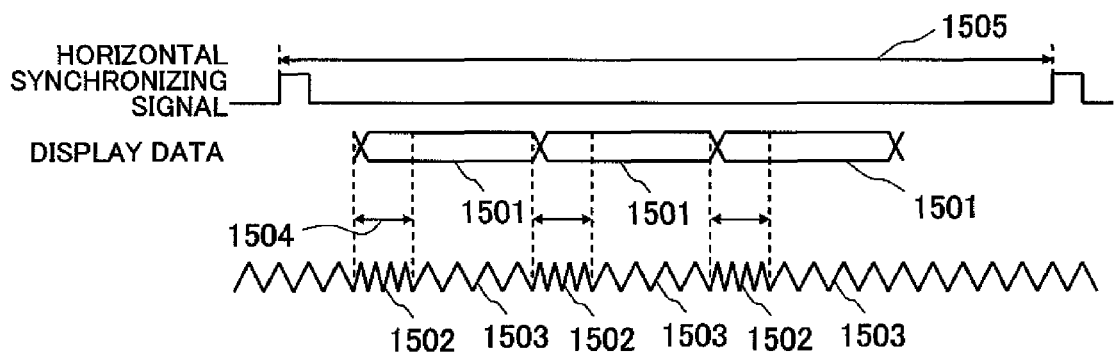
FIG. 15 is a diagram illustrating an operation in the case where a high-load period is set to be a display effective period in a power supply circuit in a sixth embodiment of the present invention.

FIG. 15 is a diagram illustrating the operation performed when a high-load period is set to be a display effective period in a power supply circuit of a display device according to a sixth embodiment of the present invention. FIG. 15 is a diagram illustrating a pulse width control signal in an RGB time-division driving system in which one horizontal synchronizing period 1505 is divided into three periods, and R data, G data, and B data corresponding to respective sub-pixels of red (R), green (G), and blue (B) are applied successively in each divided period 1501 in the same way as in the power supply circuit of the third embodiment described above. Further, in the power supply circuit of the sixth embodiment, the configuration other than the pulse control circuit and the oscillator is the same as that of the first embodiment. Thus, in the following description, only the pulse control circuit and the oscillator of the sixth embodiment are described in detail.

As illustrated in FIG. 15, the power supply circuit of the sixth embodiment changes the period of a pulse width control signal in each period obtained by dividing one horizontal synchronizing period 1401 into three periods, which is characteristic of the RGB time-division driving system, based on a vertical synchronizing signal, a horizontal synchronizing signal, and a dot clock that are signals for driving a display panel (not shown) supplied with power by the power supply circuit. More specifically, in the signal rising period 1504 for outputting each data of RGB, the current consumption of the display panel becomes largest, and hence the period of the pulse width control signal 1502 is halved. Further, in the case where the potential of a pixel approaches a data voltage after an elapse of a predetermined time from the signal rising, the power consumption of the display panel becomes small, and hence, the power supply circuit returns the period of the pulse width control signal 1503 to the original period. Thus, in the signal rising period 1504 in which writing of display data of RGB of the display panel is started in the one horizontal synchronizing period 1505, for example, display data is output to a drain line to which each sub-pixel of the display panel is connected, and hence the power consumption amount increases. In the signal rising period 1504, the power supply circuit of this embodiment enhances the power efficiency by setting the period of the pulse width control signal to be a half of the period in the period 1503 other than the signal rising period 1504. The period of the pulse width control signal illustrated in FIG. 15 is illustrated schematically, which is different from an actual period.

The pulse control circuit of the sixth embodiment includes the frequency control circuit of the third embodiment described above. In the signal rising period 1504, the frequency control circuit outputs a high level, and in a period which is not determined to be the signal rising period 1504, a low level is output.

Thus, the pulse control circuit of the sixth embodiment including the frequency control circuit may halve the period of the pulse width control output in the three signal rising periods 1504 in the one horizontal synchronizing period 1505 in which a write operation for RGB is performed, and may return the other period to the original period. Therefore, the decrease in power efficiency at a high load of the output voltage may be prevented, and consequently, the power efficiency in the entire operation period including the periods other than the signal rising period 1504 may be enhanced.

In the power supply circuit of the sixth embodiment, as means for changing the period of the pulse width control output that is output from the pulse control circuit, the output of the frequency control circuit of the third embodiment is used. However, the present invention is not limited thereto. Even in the case of using the frequency control circuit of the fourth embodiment described above, the above-mentioned effects may be obtained. Further, in the sixth embodiment, the period of the pulse width control signal is halved, but the present invention is not limited thereto, and 1/n (where n is a natural number equal to or larger than 2) or smaller may be applied.

Seventh Embodiment

Figure 16:
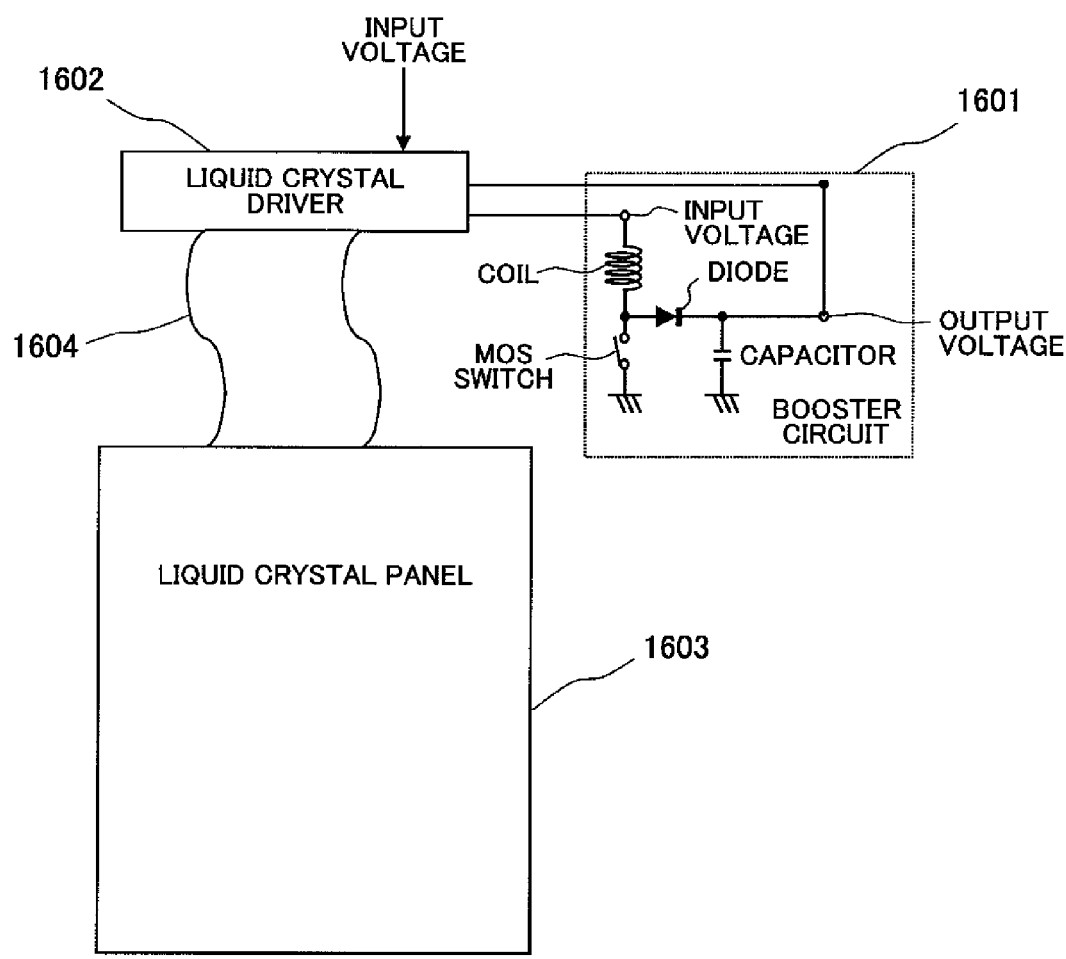
FIG. 16 is a diagram illustrating a schematic configuration of a liquid crystal display device in a seventh embodiment of the present invention.

FIG. 16 is a diagram illustrating a schematic configuration of a liquid crystal display device according to a seventh embodiment of the present invention. As is apparent from FIG. 16, the liquid crystal display device of the seventh embodiment includes a booster circuit 1601, a liquid crystal driver 1602, a liquid crystal panel 1603, and a flexible printed board 1604 that connects the liquid crystal panel 1603 to the liquid crystal driver 1602. Although not illustrated, the liquid crystal panel 1603 includes a well-known backlight device or the like.

In the liquid crystal display device of this embodiment, the liquid crystal driver 1602 includes the power supply circuit of any one of the first to sixth embodiments described above. More specifically, a semiconductor circuit portion including the oscillator 101, the frequency control circuit 102, the comparator 103, and the pulse control circuit 104 related to the configuration of the power supply circuit of any one of the first to sixth embodiments is provided in the liquid crystal driver 1602. Further, the coil, the diode, the MOS switch, the capacitor, and the like are provided in the booster circuit 1601. The power supply circuit is formed of the booster circuit 1601 and the semiconductor circuit portion (not shown) included in the liquid crystal driver 1602.

In the liquid crystal display device including the power supply circuit of any one of the first to sixth embodiments, an input voltage input to the liquid crystal driver 1602 is output to the booster circuit 1601, and the booster circuit 1601 outputs a driving voltage required for driving the liquid crystal panel 1603. The liquid crystal display device drives pixels (not shown) formed in the liquid crystal panel 1603, using the output voltage of the booster circuit 1601, thereby performing an image display corresponding to the display data.

At this time, an operation of boosting the input voltage using the power supply circuit of any one of the first to sixth embodiments is performed, and hence, the power efficiency of the liquid crystal display device of this embodiment may be enhanced.

Eighth Embodiment

Figure 17:
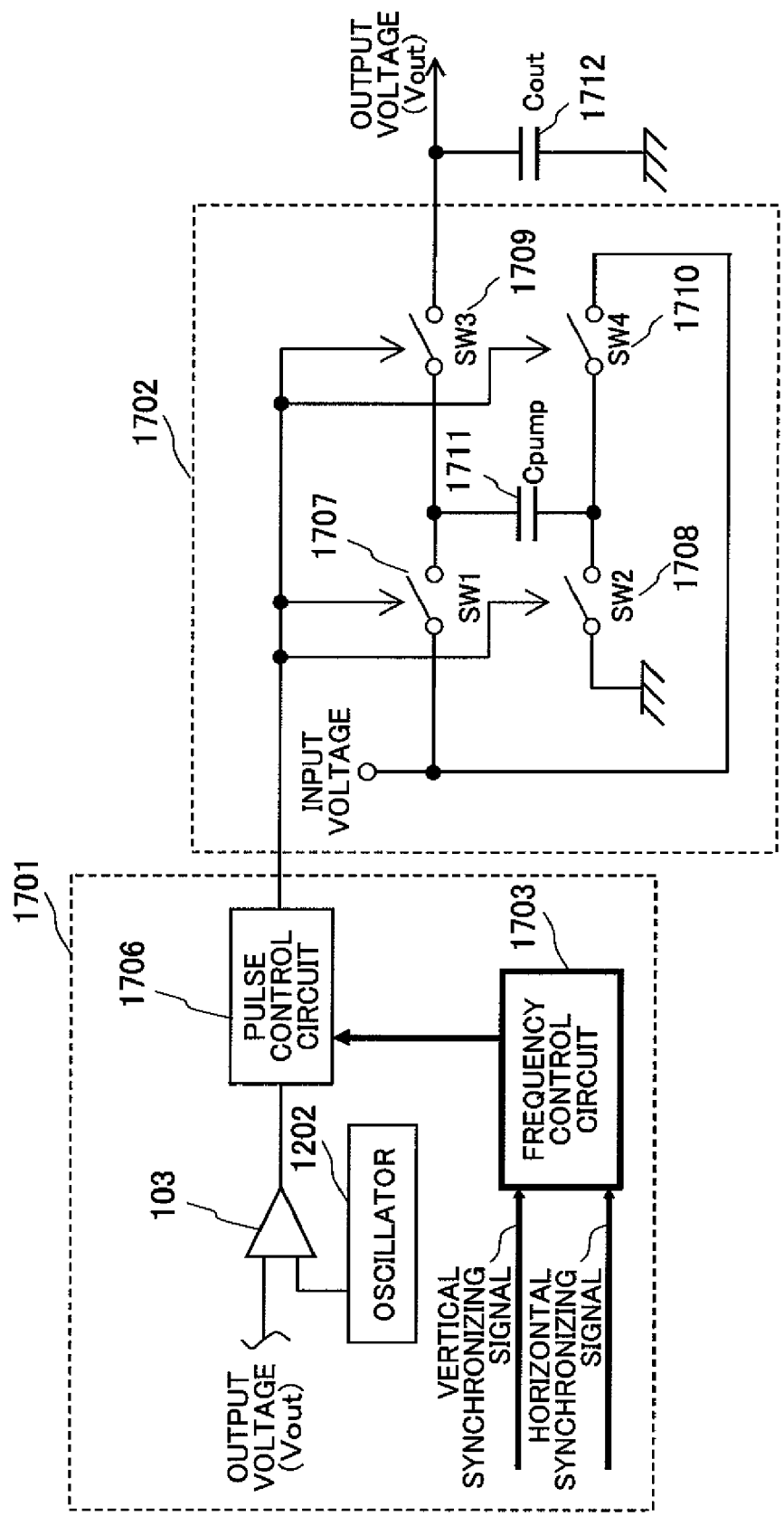
FIG. 17 is a diagram illustrating a schematic configuration of a charge pump type power supply circuit in an eighth embodiment of the present invention.

FIG. 17 is a diagram illustrating a configuration of a charge pump type power supply circuit of a display device according to an eighth embodiment of the present invention. FIG. 17 is a schematic diagram illustrating configurations of a charge pump type booster circuit 1702 and a control circuit 1701. The charge pump type booster circuit repeats an operation of charging a pump capacitor $C_{pump}$ (1711) provided in a circuit by controlling four switching elements SW1 (1707), SW2 (1708), SW3 (1709), and SW4 (1710) provided in the charge pump type booster circuit 1702 of FIG. 17, and discharging the charges to an output capacitor $C_{out}$ (1712), thereby outputting a boosted voltage. Based on a control signal input by the control circuit 1701, the switching elements SW1 and SW2, and the switching elements SW3 and SW4 in the charge pump type booster circuit 1702 are turned on alternately. Herein, the switching elements are transistors such as TFTs, and particularly in the eighth embodiment, the switching element is turned on when a high voltage is applied to a gate voltage of the transistor, and the switching element is turned off when a low voltage is applied to the gate voltage, in the same way as in the MOS switch of the third embodiment.

Figure 18A:
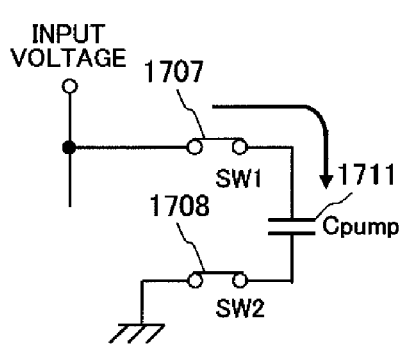
FIG. 18A is a diagram illustrating a charging operation of a capacitor in the charge pump type power supply circuit in the eighth embodiment of the present invention.
Figure 18B:
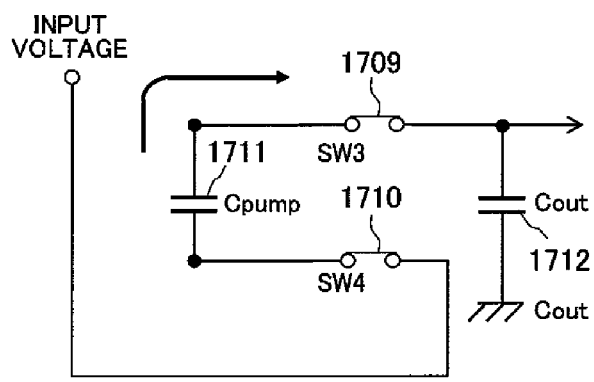
FIG. 18B is a diagram illustrating a discharging operation of a capacitor in the charge pump type power supply circuit in the eighth embodiment of the present invention.

FIGS. 18A and 18B illustrate portions obtained by excluding the portions, which do not contribute to the flow of a current when the switching element is turned off, from the configuration illustrated in FIG. 17.

FIG. 18A is a schematic diagram illustrating a flow of a current in the case where the control circuit 1701 turns on the switching elements SW1 and SW2 and turns off the switching elements SW3 and SW4. In FIG. 18A, the portions on the side of the switching elements SW3 and SW4, which are turned off, are omitted. In this state, a current flows through the pump capacitor $C_{pump}$ with the input voltage, and the pump capacitor $C_{pump}$ is charged. In FIG. 18A, the flow of a current is indicated by an arrow. A negative electrode of the pump capacitor $C_{pump}$ is grounded, and hence the potential of a positive electrode of the pump capacitor $C_{pump}$ after the completion of the charging of the pump capacitor $C_{pump}$ is the same as the potential of the input voltage.

Next, the control circuit 1701 turns off the switching elements SW1 and SW2 and turns on the switching elements SW3 and SW4. FIG. 18B is a schematic diagram illustrating a flow of a current in this case. In FIG. 18B, the portions on the side of the switching elements SW1 and SW2, which are turned off, are omitted. In FIG. 18B, the flow of a current is indicated by an arrow in the same way as in FIG. 18A. In this state, a current flows from the pump capacitor $C_{pump}$ to the output capacitor $C_{out}$, and the potential of the positive electrode of the output capacitor $C_{out}$ is higher than the potential of the input voltage. The operation in this case is described in more detail. When the switching element SW4 is turned on with the pump capacitor $C_{pump}$ being charged after the switching elements SW1 and SW2 are turned off, the negative electrode of the pump capacitor $C_{pump}$ is connected to the input voltage. Thus, the potential of the positive electrode of the pump capacitor $C_{pump}$ becomes higher than the potential of the input voltage. Then, when the switching element SW3 is turned on, a current flows from the positive electrode of the pump capacitor $C_{pump}$, which has become a high potential, to the output capacitor $C_{out}$, and the pump capacitor $C_{pump}$ is discharged and the output capacitor $C_{out}$ is charged. If the state of the switching element is kept, the output capacitor $C_{out}$ is discharged. Therefore, the potential of the positive electrode of the output capacitor $C_{out}$ decreases with the passage of time. However, the control circuit 1701 repeatedly turns on the switching elements SW1 and SW2 and the switching elements SW3 and SW4 alternately, whereby the pump capacitor $C_{pump}$ is repeatedly charged and discharged. This allows the potential of the positive electrode of the output capacitor $C_{out}$ to be kept at a predetermined potential or more, and the output voltage is similarly kept to be a predetermined potential or more.

Next, the control circuit 1701 is described. The control signal input to the charge pump type booster circuit 1702 is generated in the control circuit 1701. The power supply circuit of the eighth embodiment includes a pulse control circuit 1706 for inputting a vertical synchronizing signal and a horizontal synchronizing signal and controlling the period in which the switching elements SW1 to SW4 are turned on/off, based on the vertical synchronizing signal and the horizontal synchronizing signal, and the output of the comparator 103. The clock signal from the oscillator 1202 and the output voltage are input to the comparator 103, and the pulse control circuit 1706 of the eighth embodiment controls the ON/OFF of the switching elements SW1 to SW4 based on the comparison output of the comparator 103. The detail of the pulse control circuit 1706 of this embodiment is the same as that in the method of controlling the switching regulator circuit described in the fifth embodiment (FIGS. 13A to 13C) of the present invention.

More specifically, in the control circuit 1701 of the eighth embodiment, the pulse control circuit 1706 that generates and outputs a first control signal for controlling the ON/OFF of the switching elements SW1 and SW2 and a second control signal for controlling the ON/OFF of the switching elements SW3 and SW4, which is a control signal in a phase opposite to the first control signal, is configured as a block independent from the frequency control circuit 1703. Thus, in the eighth embodiment, the frequency control circuit 1703 outputs a signal for selecting a control period based on the vertical synchronizing signal and the horizontal synchronizing signal, and the pulse control circuit 1706 varies the period of the output thereof based on the selecting signal. In the eighth embodiment, the case where the frequency control circuit 1703 and the pulse control circuit 1706 are configured as separated blocks has been described. However, the frequency control circuit may be provided in the pulse control circuit 1706 in the same way as in the fifth embodiment. Further, the frequency control circuit 1703 of the eighth embodiment may have a configuration similar to that of the frequency control circuit of the second embodiment, as in the case of the frequency control circuit formed in the pulse control circuit of the fifth embodiment.

The efficiency of the charge pump type power supply circuit is considered to be largely influenced by heat consumption at a resistor of a switching element. In this case, when the fluctuation in a voltage of the capacitor for a charge pump is large, the amount of a current to be charged increases, which increases the consumption at a thermal resistor. Further, when the fluctuation in a voltage of an output voltage is large, the discharging amount from the capacitor for a charge pump similarly increases, with the result that the efficiency of the charge pump decreases similarly.

In contrast, in the eighth embodiment of the present invention, the control as illustrated in FIG. 13C in the fifth embodiment is performed so that the charging operation of the capacitor for a charge pump $C_{pump}$ is performed before the timing at which an output voltage drops largely and a large amount of charges are discharged from the output capacitor $C_{out}$, whereby the voltage drop may be suppressed. Consequently, the power efficiency may be enhanced.

In the display device of the eighth embodiment, the comparator 103 compares the output voltage and a clock signal generated by the oscillator. However, the present invention is not limited thereto. A reference voltage may be previously generated and compared with the output voltage by the comparator. Further, as described in FIG. 9 of the third embodiment and FIG. 15 of the sixth embodiment, even in the RGB time-division driving system in which one horizontal synchronizing period is divided into three periods, and R data, G data, and B data corresponding to respective sub-pixels of red (R), green (G), and blue (B) are applied successively in each divided period 901, the control similar to those of the third and sixth embodiments may be applied.

Hereinabove, the invention achieved by the inventors has been described specifically based on the embodiments of the present invention. According to the present invention, as described above in each embodiment, in the high-load period of the display device, i.e., in the data voltage application period in which the current consumption in the display device (liquid crystal panel) becomes largest, the frequency of a clock signal is increased and the discharging time of a current in the liquid crystal panel is shortened, whereby the drop amount of an output voltage is reduced (ripple reduction), which may enhance the power efficiency.

Further, in the low-load period of the display device, i.e., in the data voltage retention period in which the current consumption in the display device becomes smallest, the drop amount of an output voltage is originally small. Therefore, the boosted amount of an output voltage is reduced (ripple reduction) by lowering the frequency of a clock signal, which may enhance the power efficiency.

Further, the drop amount of an output voltage is reduced (ripple reduction) by setting the control signal pulse period of a MOS-FET in the high-load period to be a half of the control signal pulse period in the low-load period and shortening the discharging time of a current in the liquid crystal panel, which may enhance the power efficiency.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A power supply circuit of a display device, for boosting an input voltage and supplying a driving voltage higher than the input voltage to the display device, comprising:
   a coil that is charged with charges corresponding to the input voltage;
   a switching element for controlling charging of the coil with the charges and discharging of the charged charges;
   a capacitor for stabilizing an output voltage in a charging period of the coil;
   an oscillator for generating a clock signal as a reference of the output voltage;
   a comparator for comparing the clock signal with the output voltage;
   a pulse control circuit for generating a control signal of the switching element in accordance with an output signal of the comparator; and
   a frequency control circuit for inputting a vertical synchronizing signal and a horizontal synchronizing signal of the display device, and controlling a frequency of the clock signal generated by the oscillator based on the input vertical synchronizing signal and the input horizontal synchronizing signal, wherein:
   the frequency control circuit counts a number of outputs of the horizontal synchronizing signal following an output of the vertical synchronizing signal;
   the frequency control circuit controls the frequency of the clock signal to be different for a first state in which the number of outputs of the horizontal synchronizing signal is between a first number of outputs and a second number of outputs which are previously set, and for a second state in which the number of outputs of the horizontal synchronizing signal is not between the first number of outputs and the second number of outputs; and
   the frequency of the clock signal for the first state is higher than the frequency of the clock signal for the second state.

2. The power supply circuit of a display device according to claim 1, wherein the frequency control circuit comprises non-volatile storage means, and the non-volatile storage means holds the first number of outputs and the second number of outputs.

3. The power supply circuit of a display device according to claim 1, further comprising means for setting the first number of outputs and the second number of outputs.

4. The power supply circuit of a display device according to claim 1, wherein the frequency control means is shiftable between the first state and the second state, based on an effective data signal indicating a horizontal effective display period of the display device and the number of outputs of the horizontal synchronizing signal.

5. The power supply circuit of a display device according to claim 1, wherein:
   the frequency control circuit divides a writing period of display data to each pixel of red (R), green (G), and blue (B) in one horizontal period into a signal rising period and another period, and controls the frequency of the clock signal to be different for the signal rising period and for the another period; and
   the frequency control circuit controls the frequency of the clock signal for the signal rising period to be higher than the frequency of the clock signal for the another period.

6. The power supply circuit of a display device according to claim 5, wherein:
   the frequency control circuit counts a number of dot signals synchronized with writing signals of the display data to the pixel following an output of the horizontal synchronizing signal; and
   the frequency control circuit sets a period in which the number of dot signals is between a first number of signals and a second number of signals which are previously set for each pixel of R, G, and B as the signal rising period.

7. The power supply circuit of a display device according to claim 6, wherein the frequency control circuit comprises non-volatile storage means, and the non-volatile storage means holds the first number of signals and the second number of signals.

8. The power supply circuit of a display device according to claim 6, further comprising means for setting the first number of signals and the second number of signals.

9. The power supply circuit of a display device according to claim 6, wherein the frequency control circuit is shiftable between the signal rising period and the another period based on an effective data signal indicating a horizontal effective display period of the display device and the number of dot signals.

10. A display device, comprising:
    a display driving circuit including the power supply circuit according to claim 1; and
    a display panel for performing an image display in accordance with display data from the display driving circuit.

11. A power supply circuit of a display device for boosting an input voltage and supplying a driving voltage higher than the input voltage to the display device, comprising:
    a coil that is charged with charges corresponding to the input voltage;
    a switching element for controlling charging of the coil with the charges and discharging of the charged charges;
    a capacitor for stabilizing an output voltage in a charging period of the coil;
    an oscillator for generating a clock signal as a reference of the output voltage;
    a comparator for comparing the clock signal with the output voltage; and
    a pulse control circuit for generating a control signal of the switching element in accordance with an output signal of the comparator, wherein:
    the pulse control circuit monitors a load of the display device based on a vertical synchronizing signal and a horizontal synchronizing signal of the display device;
    the pulse control circuit outputs, in a low-load period in which the load is light, the control signal once in a predetermined period, and outputs, in a high-load period in which the load is heavy, the control signal at least twice in the predetermined period;
    the pulse control circuit counts a number of outputs of the horizontal synchronizing signal of the display device following an output of the vertical synchronizing signal of the display device; and
    the pulse control circuit sets a period in which the number of outputs of the horizontal synchronizing signal of the display device is between a first number of outputs and a second number of outputs which are previously set as the high-load period, and sets a period in which the number of outputs of the horizontal synchronizing signal is not between the first number of outputs and the second number of outputs as the low-load period.

12. A power supply circuit of a display device for boosting an input voltage and supplying a driving voltage higher than the input voltage to the display device, comprising:
- a coil that is charged with charges corresponding to the input voltage;
- a switching element for controlling charging of the coil with the charges and discharging of the charged charges;
- a capacitor for stabilizing an output voltage in a charging period of the coil;
- an oscillator for generating a clock signal as a reference of the out u voltage;
- a comparator for comparing the clock signal with the output voltage; and
- a pulse control circuit for generating a control signal of the switching element in accordance with an output signal of the comparator, wherein:
- the pulse control circuit monitors a load of the display device based on a vertical synchronizing signal and a horizontal synchronizing signal of the display device;
- the pulse control circuit outputs, in a low-load period in which the load is light, the control signal once in a predetermined period, and outputs, in a high-load period in which the load is heavy, the control signal at least twice in the predetermined period; and
- the pulse control circuit divides a writing period of display data to each pixel of red (R), green (G), and blue (B) in one horizontal period into the high-load period and the low-load period.

13. A power supply circuit of a display device, for boosting an input voltage and supplying a driving voltage higher than the input voltage to the display device, comprising:
- a first capacitor that is charged with charges corresponding to the input voltage;
- a switching element for controlling charging of the first capacitor with the charges and discharging of the charged charges;
- a second capacitor for stabilizing an output voltage in a charging period of the first capacitor;
- an oscillator for generating a clock signal as a reference of the output voltage;
- a comparator for comparing the clock signal with the output voltage;
- a pulse control circuit for generating a control signal of the switching element in accordance with an output signal of the comparator; and
- a frequency control circuit for inputting a vertical synchronizing signal and a horizontal synchronizing signal of the display device, and controlling a frequency of the control signal of the switching element output from the pulse control circuit based on the input vertical synchronizing signal and the input horizontal synchronizing signal, wherein:
- the frequency control circuit counts a number of outputs of the horizontal synchronizing signal following an output of the vertical synchronizing signal;
- the frequency control circuit controls the frequency of the control signal to be different for a first state in which the number of outputs of the horizontal synchronizing signal is between a first number of outputs and a second number of outputs which are previously set and for a second state in which the number of outputs of the horizontal synchronizing signal is not between the first number of outputs and the second number of outputs; and
- the frequency of the control signal for the first state is higher than the frequency of the control signal for the second state.

14. The power supply circuit of a display device according to claim 13, wherein the frequency control circuit comprises non-volatile storage means, and the non-volatile storage means holds the first number of outputs and the second number of outputs.

15. The power supply circuit of a display device according to claim 13, further comprising means for setting the first number of outputs and the second number of outputs.

16. The power supply circuit of a display device according to claim 13, wherein the frequency control means is shiftable between the first state and the second state, based on an effective data signal indicating a horizontal effective display period of the display device and the number of outputs of the horizontal synchronizing signal.

17. The power supply circuit of a display device according to claim 13, wherein:
- the frequency control circuit divides a writing period of display data to each pixel of red (R), green (G), and blue (B) in one horizontal period into a signal rising period and another period, and controls the frequency of the control signal to be different for the signal rising period and for the another period; and
- the frequency control circuit controls the frequency of the control signal for the signal rising period to be higher than the frequency of the control signal for the another period.

18. The power supply circuit of a display device according to claim 17, wherein:
- the frequency control circuit counts a number of dot signals synchronized with writing signals of the display data to the pixel following an output of the horizontal synchronizing signal; and
- the frequency control circuit sets a period in which the number of dot signals is between a first number of signals and a second number of signals which are previously set for each pixel of R, G, and B as the signal rising period.

19. The power supply circuit of a display device according to claim 18, wherein the frequency control circuit comprises non-volatile storage means, and the non-volatile storage means holds the first number of signals and the second number of signals.

* * * * *